US009052879B2

(12) United States Patent  (10) Patent No.: US 9,052,879 B2
Scott et al.  (45) Date of Patent: Jun. 9, 2015

(54) MAPPING ASSURANCE METHOD AND APPARATUS FOR INTEGRATING SYSTEMS

(75) Inventors: George M. Scott, Sunnyvale, CA (US); Vasile Patrascu, San Jose, CA (US); Erin Hoffmann Schroepfer, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 11/062,068

(22) Filed: Feb. 18, 2005

(65) Prior Publication Data

US 2006/0190931 A1  Aug. 24, 2006

(51) Int. Cl.
*G06F 7/00* (2006.01)
*G06F 9/44* (2006.01)

(52) U.S. Cl.
CPC ........................................ *G06F 8/20* (2013.01)

(58) Field of Classification Search
None
See application file for complete search history.

(56) References Cited

U.S. PATENT DOCUMENTS

| | | | |
|---|---|---|---|
| 5,930,512 A | 7/1999 | Boden et al. | |
| 6,639,687 B1 * | 10/2003 | Neilsen | 358/1.14 |
| 6,662,237 B1 * | 12/2003 | Leckie | 719/320 |
| 6,725,445 B1 | 4/2004 | Leymann et al. | |
| 6,772,407 B1 | 8/2004 | Leymann et al. | |
| 7,139,999 B2 | 11/2006 | Bowman-Amuah | |
| 7,146,399 B2 * | 12/2006 | Fox et al. | 709/203 |
| 7,225,411 B1 * | 5/2007 | Stoner et al. | 715/760 |
| 7,496,887 B2 | 2/2009 | Grasselt et al. | |
| 7,620,665 B1 * | 11/2009 | George et al. | 1/1 |
| 7,653,562 B2 | 1/2010 | Schulz et al. | |
| 8,332,806 B2 | 12/2012 | Patrascu et al. | |
| 2001/0055017 A1 * | 12/2001 | Ording | 345/440 |
| 2002/0055664 A1 | 5/2002 | Liu | |
| 2002/0174000 A1 | 11/2002 | Katz et al. | |
| 2003/0083910 A1 | 5/2003 | Sayal et al. | |
| 2003/0225789 A1 * | 12/2003 | Bussler et al. | 707/104.1 |
| 2004/0068509 A1 * | 4/2004 | Garden et al. | 707/100 |
| 2004/0133457 A1 | 7/2004 | Sadiq et al. | |
| 2004/0261063 A1 * | 12/2004 | Wang et al. | 717/136 |
| 2005/0021513 A1 * | 1/2005 | Vedula et al. | 707/3 |
| 2005/0027681 A1 * | 2/2005 | Bernstein et al. | 707/1 |
| 2005/0049906 A1 | 3/2005 | Leymann et al. | |
| 2005/0050068 A1 * | 3/2005 | Vaschillo et al. | 707/100 |
| 2005/0055664 A1 | 3/2005 | Kloppmann et al. | |

(Continued)

OTHER PUBLICATIONS

Sayal, Mehmet et al. Integrating Workflow Management Systems with Business-to-Business Interaction Standards, Proceedings of the 18th International conference on Data Engineering, 2002, IEEE Computer Society, Washington, DC, US.

(Continued)

*Primary Examiner* — Debbie Le
*Assistant Examiner* — Hasanul Mobin
(74) *Attorney, Agent, or Firm* — Patterson & Sheridan, LLP

(57) ABSTRACT

A method and apparatus is provided to assure transformations between applications in an integration project. This assurance of transformations between applications includes mapping one or more related fields from a set of fields between the one or more source applications and the one or more target applications according to a set of integration objectives, checking a type compatibility for each of the one or more related fields mapped between the one or more source applications and the one or more target applications and indicating a mapping status according to the type compatibility between the source applications and the target applications.

34 Claims, 7 Drawing Sheets

(56) References Cited

U.S. PATENT DOCUMENTS

| | | |
|---|---|---|
| 2005/0149484 A1* | 7/2005 | Fox et al. ............... 707/1 |
| 2005/0222965 A1* | 10/2005 | Chaudhuri et al. ........ 707/1 |
| 2006/0190931 A1 | 8/2006 | Scott et al. |
| 2006/0224702 A1 | 10/2006 | Schmidt et al. |
| 2007/0006122 A1 | 1/2007 | Bailey et al. |
| 2007/0179939 A1* | 8/2007 | O'Neil et al. ............. 707/4 |
| 2008/0281659 A1 | 11/2008 | Kloppmann et al. |
| 2009/0171708 A1 | 7/2009 | Bobak et al. |
| 2011/0131545 A1 | 6/2011 | Patrascu et al. |
| 2013/0019223 A1 | 1/2013 | Patrascu et al. |

OTHER PUBLICATIONS

Gottschalk, Florian et al., Configurable Workflow Models, International Journal of Cooperative Information Systems, Mar. 10, 2008, World Scientific Publishing, Singapore.

Joeris, Gregor et al., Managing Evolving Workflow Specifications, Proceedings of the 3rd IFCIS International Conference on Cooperative Information Systems, 1998, pp. 310-321, IEEE Computer Society, Washington, DC, US.

* cited by examiner

MAPPING ASSURANCE METHOD AND APPARATUS FOR INTEGRATING SYSTEMS

BACKGROUND OF THE INVENTION

Many companies leverage computer systems and software applications to improve their efficiency and organization in business. Often these systems are integrated together allowing information from one software application or system to be used or analyzed by another software application or system. Benefits associated with integrating and using these computer systems and software in business are numerous and include tighter control over inventory, improved financial forecasting, streamlined information-flow internally and externally and sales force automation.

The various benefits of leveraging computer technology generally justifies the hiring of large information technology (IT) staff to keep these computer systems operational and communicating with each other. Often, these IT departments are saddled with the task of integrating many disparate computer systems and software applications in attempt to make corporate information flow more freely and securely.

Unfortunately, the complexity of integrating these large computer systems and software applications in a company has made systems integration a daunting and expensive task. Systems integration projects have become increasingly complicated requiring specialized knowledge of applications, protocols, communications, hardware and other areas that the IT staff at a given company may not possess. Even with the proper knowledge and training, most IT departments are too small to complete large scale systems integration projects in a reasonable time frame.

Consequently, a large number of system integration projects require customized development completed using consultants or outsourced to system integrators that specialize in integrating these large scale systems. The solutions involve integrating the data and business logic between several existing applications and frequently involve complex solutions. Because the work is outsourced and/or complex, these customized solutions can also be very expensive. Maintaining software as the companies grow and their needs change may also cost a great deal of money as the same consultants may be needed after the initial systems integration effort is put in place.

In attempt to reduce costs and expedite the integration, many companies are exploring system integration tools/methodologies as an alternative to customized software development. These solutions include enterprise application integration (EAI) solutions and application server technologies. The EAI solution provides a solution to some of the system integration problems but requires a company to commit to a proprietary platform. Application server solutions are also useful but also involve proprietary protocols. Scalability is also a problem with these methodologies as companies grow and demand more processing power and throughput from their systems.

SUMMARY OF THE INVENTION

One aspect of the present invention includes a method, apparatus and computer program product to assure transformations between applications in an integration project. This assurance of transformations between applications includes mapping one or more related fields from a set of fields between the one or more source applications and the one or more target applications according to a set of integration objectives, checking a type compatibility for each of the one or more related fields mapped between the one or more source applications and the one or more target applications and indicating a mapping status according to the type compatibility between the source applications and the target applications.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Aspects of the present invention provide one or more of the following advantages. Source and target applications can be integrated together in a given integration project with fewer errors. Issues with type compatibility between the fields in a source application and a target application are checked prior to run time. Type compatibility problems are flagged as the fields from the source application are mapped to certain specific fields in the target application. Resolving errors and warnings in advance makes errors due to type compatibility between fields in a source and target application less likely to occur during runtime.

In certain cases, implementations of the present invention can be configured to disallow compilation or further processing if a source and target application have field or type compatibility problems. Conditionally compiling the mapping in this manner keeps field type compatibility issues to a minimum. Type compatibility related issues are necessarily addressed during the mapping phase rather than later during the runtime operation when they are more subtle and difficult to detect.

Aspects of the present invention provide visual indicators to make the mapping tools in an integration project easier to use. For example, type compatibility problems between the source applications and the target applications are displayed visually as mappings between the fields are made. A user can utilize these visual indicators to address each type compatibility problems in sequence until an acceptable mapping status is indicated. To measure overall mapping progress, a completion status indicator considers the mapping completed and the additional mapping required to complete the project. Both indicators provide immediate visual feedback to guide a user through the mapping of fields and application integration.

Figure 1:
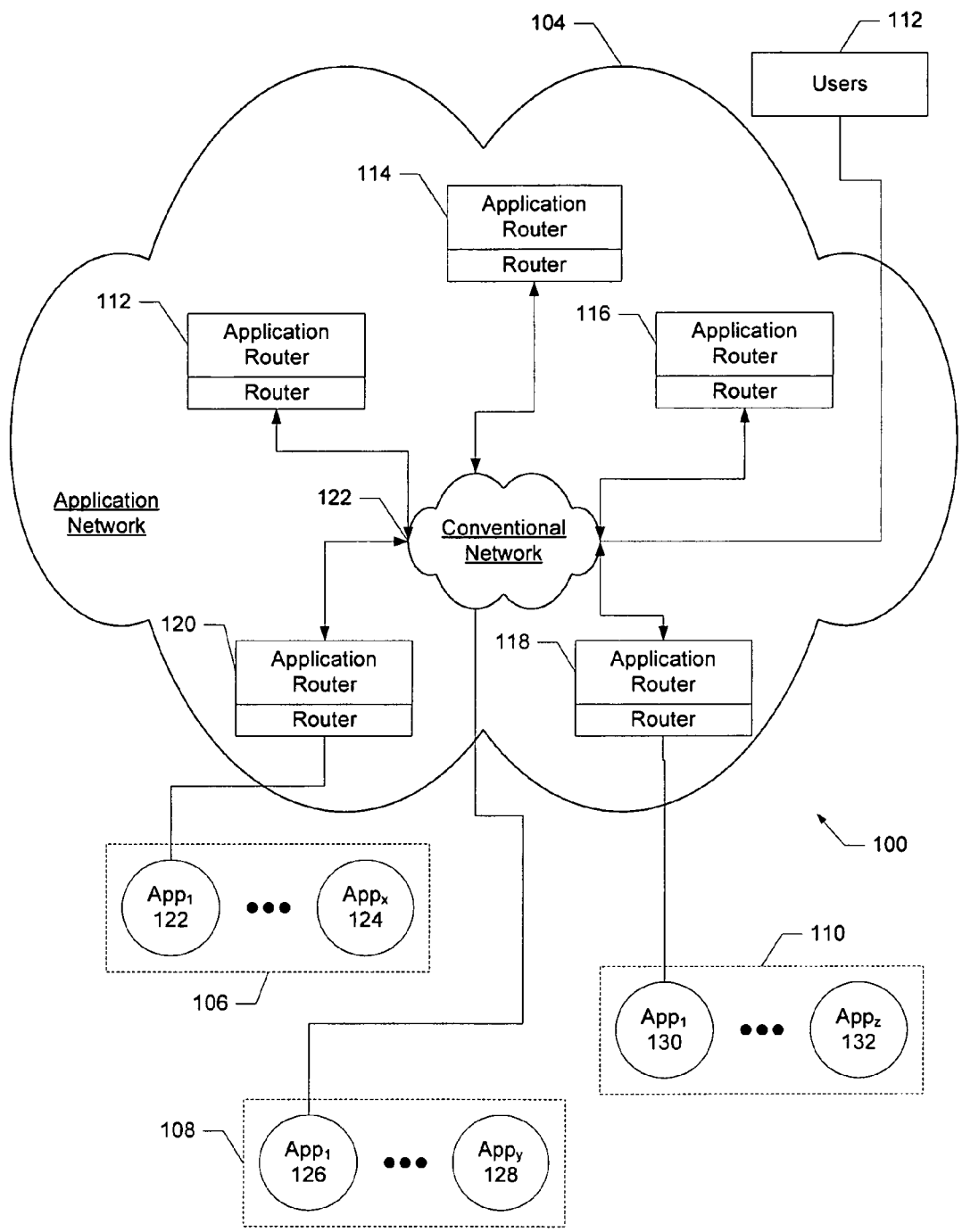
FIG. 1 is a block diagram illustrating a system using application routers in an application network in accordance with one implementation of the present invention.

FIG. 1 is a block diagram illustrating a system 100 using application routers in an application network 104 in accordance with one implementation of the present invention. System 100 includes application router network 104, application set 106, application set 108, application set 110 and users 112 accessing these various application sets over application router network 104. Each application set includes a number of different applications grouped together based on common traits, shared data/information or other types of relationships to each other. Specifically, application set 106 includes applications $app_1$ 122 through $app_x$ 124, application set 108 includes applications $app_1$ through $app_y$ 128 and application set 110 includes applications $app_1$ 130 through $app_z$ 132. For example, application set 106 may include all the enterprise applications used for a manufacturing division of a company while application set 108 includes enterprise applications used in the sales and marketing division of a company. For the same company, application set 110 may further include corporate enterprise applications concerning financial management, human resources, corporate tax and accounting, research and other corporate-wide functions. These application sets 106, 108 and 110 can be physically located in a single geographic location or distributed internationally. Alternatively, each application set 106, 108 and 110 may correspond to all the enterprise applications within different subdivisions. In this case, each application set 106, 108 and 110 may include enterprise applications for manufacturing, sales, marketing and corporate operations previously described and performed at different corresponding divisions in a company.

In either implementation above or in other configurations, it is often necessary for applications in one or more application sets to communicate across application network 104 in accordance with implementations of the present invention to other applications in other application sets. Typically, enterprise applications need to share critical information about a company or business as well as integrate different workflow requirements. For example, a manufacturing or shipping application providing just-in-time services may need to receive information gathered from purchase orders in a sales force automation application. Workflow in the manufacturing application may require payment to be made in advance before starting manufacturing and also may need to coordinate the manufacturing with another materials procurement or inventory management application located elsewhere in an enterprise. At each junction, applications need to accurately and efficiently share information and ensure certain steps are performed according to specific workflow requirements needed in each area. This complex process of exchanging data and coordinating workflow requirements is facilitated and automated in accordance with the present invention.

Application network 104 can also provides secure communications capabilities between the applications in application sets 106, 108 and 110 and users 112 operating these various applications. In this example implementation, application network 104 includes application router 112, application router 114, application router 116, application router 118 and application router 120 configured to transmit application data to each other over conventional network 122 using secure methods involving encryption, authentication and authorization of users and applications. Application level security features implemented within application routers allows access or denies access based on detailed transactional and/or application information in addition to storage partitions, file distinctions or other logical storage boundaries that may exist.

For example, a first application may be granted access to data from a second application if the data associated with the second application was previously or originally created by the first application. Of course, the first application can be granted various levels or read and/or write permissions by the second application explicitly after data in an application has been created. Application level security granularity allows application data to be securely administered based on transactions or records even if the data is under the same enterprise applications. Alternatively, if lower security is required then application routers can be configured to share all data between different applications associated with one or more application routers.

Once security is determined and processed, application data travels over conventional network 122 carried by TCP/IP, SNA, Novell Netware or any other similar network protocol capable of providing access to a layered network communication model or any other equivalent general purpose networking protocol. In practice, conventional network 122 also includes conventional routers, switches, repeaters and other networking devices familiar to those skilled in the art and used for general purpose broadband or local area networking.

Application routers 112, 114, 116, 118 and 120 include conventional routing technology along with application routing functionality in accordance with implementations of the present invention. Application routing operations receive application data, convert the application data into a neutral format and then route the data to the appropriate application through one or more application routers in application network 104. Further, application routers convert the neutral format data back into the proprietary application protocol when communicating data back to an application.

Figure 2A:
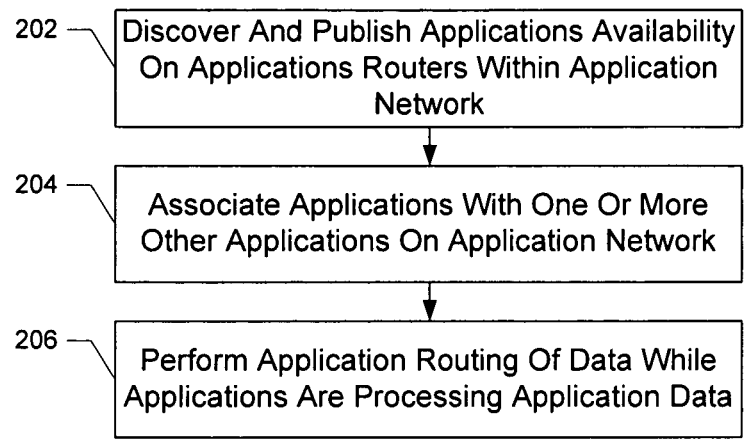
FIG. 2A is a flowchart diagram of the operations performed to integrate applications together using application routers and software in accordance with one implementation of the present invention.

FIG. 2A is a flowchart diagram of the operations performed to integrate applications together using application routers and software in accordance with implementations of the present invention. Applications initially perform discovery of other applications by publishing the application availability on the application routers within the application network (202). Applications publish application information sufficient to identify data structures used by an application to carry information, interfaces describing access methods to these data structures and protocols for transmitting/receiving information over a network. This application information is often referred to as metadata as it provides descriptive details about the information without necessarily providing the underlying substantive information. For example, substantive information may include a public-key, encrypted password or other security information used to ensure a transaction is performed securely and confidentially.

Published information facilitates associating one application in the application network with one or more other applications on the application network (204). Application routers exchange metadata and other information about different applications and then associates the different applications together. This association process maps data fields from the data structures used in a first application, the source application, with corresponding data fields from the data structures of a second application, the target application. Field type and other type processing performed in accordance with the implementations of the present invention ensures these field mappings are going to be compatible during run time. Many of the type compatibility issues deal with data formats and cardinality issues associated with groups of data. In some cases, lower level compatibility may require swapping byte order or filing data with default values to accommodate low-level formatting differences that may exist between data in the various data structures. Once the mapping has been assured, application routing commences between the source and target applications as they are processing application data (206).

Figure 2B:
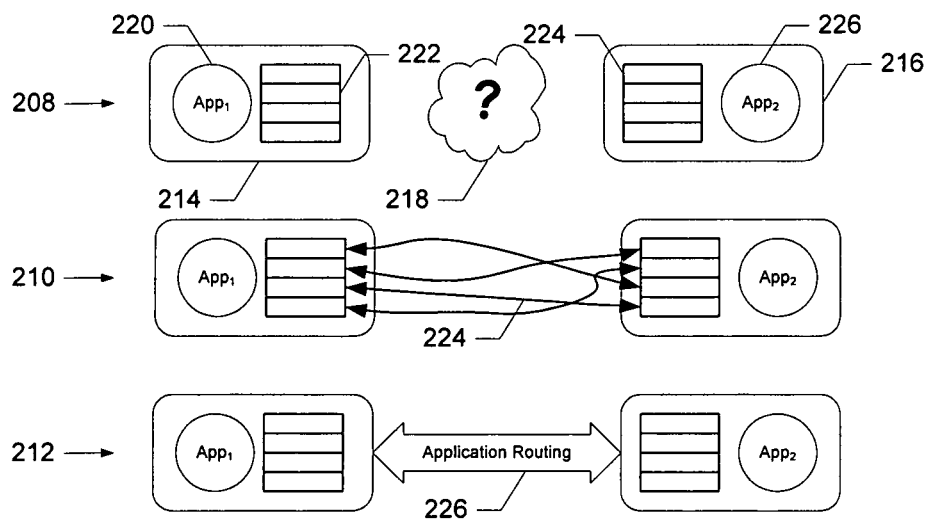
FIG. 2B is a pictorial depiction of the operations for integrating applications into the application network in accordance with one implementation of the present invention.

FIG. 2B is a pictorial depiction of these operations for integrating applications into the application network in accordance with the present invention. Applications are integrated through discovery 208, association or mapping 210 and then application routing 212. Prior to integration, $app_1$ 214 and $app_2$ 216 are placed within an application network 218 in accordance with the present invention but cannot exchange application data. During discovery 208, $app_1$ 214 and $app_2$ 216 publish their availability on application network 218. Logic 220 and application 222 from $app_1$ 214 and logic 226 along with application data 224 from $app_2$ 216 are registered and made available on the application network 218. Implementations of the present invention automatically or manually perform association 210 between $app_1$ 214 and $app_2$ 216 based upon the metadata thereby connecting application data 222 with application data 224 according to their respective logic 220 and logic 226. Mapped fields between $app_1$ 214 and $app_2$ 216 are analyzed to determine compatibility during runtime. Field type incompatibilities may be modified in response to this analysis to ensure subsequent compatibility during runtime. Consequently, once these steps are complete, routing 212 performs application routing 226 allowing applications to rapidly exchange their respective pools of information.

Figure 3:
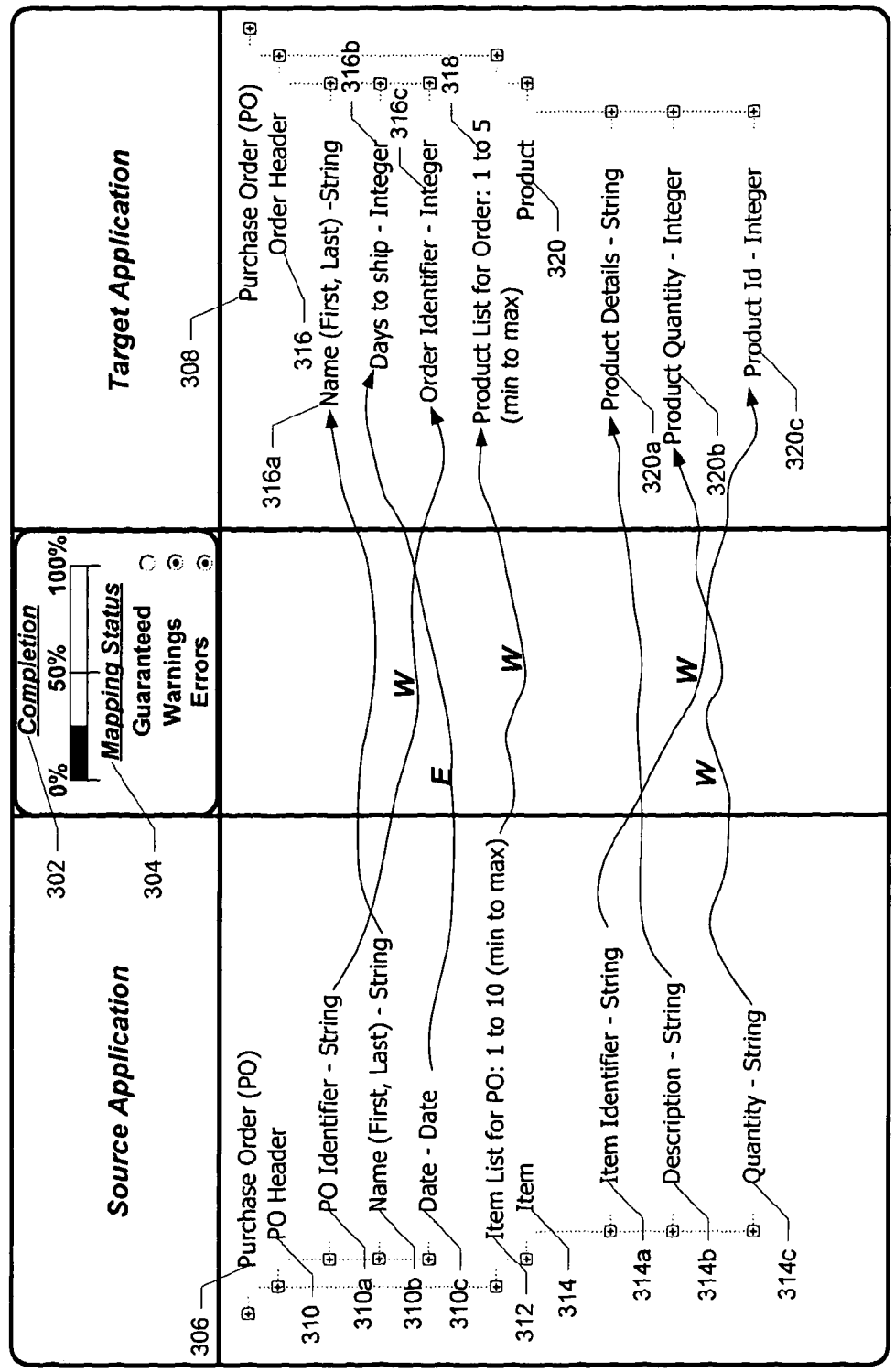
FIG. 3 illustrates a sample interface for mapping fields between a source and target application in accordance with one implementation of the present invention.

FIG. 3 illustrates a sample interface for mapping fields between a source and target application in accordance with one implementation of the present invention. In this example, mapping interface 300 provides a completion indicator 302, a mapping status indicator 304, a source application work area 306 and a target application work area 308. This particular integration project example depicts a potential mapping between a purchase order from both a source application and a target application.

The fields in source application work area 306 include a hierarchical arrangement of fields including: a purchase order (PO) header 310 to describe the overall purchase order and an item list 312 with a sequence of individual items. The PO header 310 and item list 312 can further be classified as complex types as they contain additional fields rather than directly holding data from the source application. In contrast, PO identifier 310a, name 310b and data 310c can be classified as primitive types as they contain substantive information from the particular application. Likewise, item identifier 314a, description 314b and quantity 314c are primitive types as they include substantive information about each individual item in item list 312.

Fields in target application work area 308 also include a hierarchical arrangement of fields including: order header 316 for describing details of the purchase order and product list 318 with the sequential listing of individual products and descriptive information. This example illustrates that the source application and the target application may contain similar information but define fields differently or potentially have different types associated with the fields as described below. In this part of the example, each order header 316 is a complex type containing primitive types name 316a, data 316b, and order identifier 316c. Product list 318 and product 320 are both complex types as they both include additional fields as illustrated. Each product 320 includes product details 320a, product quantity 320b and product id 320c. Of course, these are only examples provided to assist in describing aspects of the invention and many more complex or different examples can also be created other than those depicted and described in relationship to FIG. 3.

In operation, completion indicator 302 measures how many mappings in the integration project have been completed with an acceptable or guaranteed mapping compared with those not yet completed or resulting in an error. In general, the completion indicator indicates the mapping is complete when all of the required mappings have been made between the source application and target application without any errors indicated. Compared to the required mappings, optional mappings are not required to complete a mapping operation. However, any optional mapping that is attempted also need be done without error to achieve completion status for the mapping.

In one implementation, the mapping may also be considered complete according to completion indicator 302 even when some of the mappings result in a warning or guaranteed status as long as none has errors. Alternatively, completion indicator 302 can be configured to indicate completion only when all of the mappings have been made with a guaranteed status and no warnings. This latter approach would more likely result in fewer errors during runtime compared with the former approach as a result of more rigorous type checking requirements to reach completion. In either of these above or alternate approaches, completion indicator 302 can be used to disallow compilation and proceeding further if the indicator does not indicate completion status however defined.

As depicted in this example, mapping status 304 analyzes one or more mappings as specified between source application work area 306 and target application work area 308. Each mapping between primitive types in the source application is compared with the primitive type in the target application to ensure data compatibility at runtime. For example, PO identifier 310a having a string type generates a warning as it may not be compatible with its mapped counterpart order identifier 316c at runtime. This is because not all possible string types contain data compatible with an integer type.

A cardinality based warning is another different type of warning generated between item list 312 and product list 318. This type of warning indicates a mismatch between the potential number of enumerated items in the target application compared with the source application. In this example, item list 312 in source application indicates a possibility of up to 10 different items yet the product list 318 only has allocated storage for up to 5 items and thus may result in an error at runtime depending on the exact number of items being transacted. Many other types of potential mismatches between the numbers of items or types of items could be the basis of different cardinality type warnings.

Errors indicated in mapping status 304 results when the type analysis shows no possible overlap of acceptable values in the field of a source application compared with the field of a target application. In this example, date 310c from the source application generates an error when mapped to date 316b of the target application as it is not possible for a date type field to fit into an integer field without performing converting or manipulating the data. Similarly, item identifier 314a containing a string type in the source application also generates an error when mapped to product id 320c of the target application as it has an integer type.

As a result of the above processing, mapping status 304 can be configured to stop further processing as errors due to cardinality, type or other mismatch are likely to have negative effect on subsequent runtime processing. Alternatively, one or more warnings as indicated by mapping status 304 can be configured to allow further processing as it is not certain that a mismatch will occur during runtime and whether it could cause a runtime error. Of course, a guaranteed status from mapping status 304 indicates no warnings or errors and processing continues from the mapping to other operations needed in the overall integration project.

Figure 4:
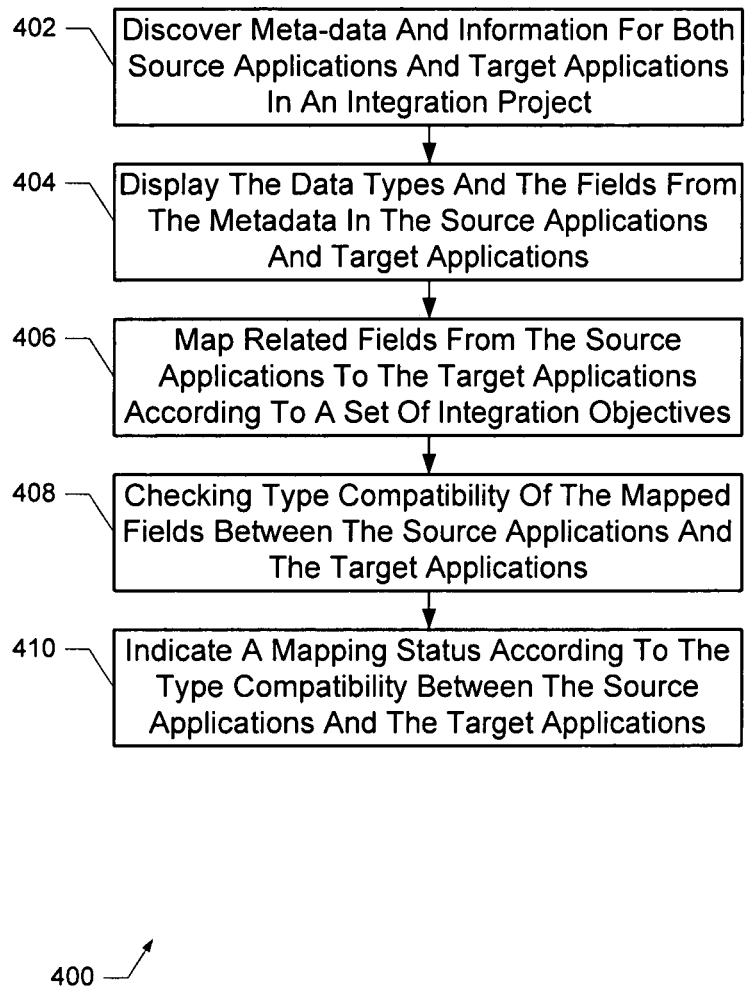
FIG. 4 is a flowchart diagram of the operations used in mapping and checking types between a source application and a target application in accordance with one implementation of the present invention.

FIG. 4 is a flowchart diagram of the operations used in mapping and checking types between a source application and a target application. During an initial discovery stage, implementations of the present invention obtain metadata and information for both source applications and target applications in an integration project (402). Metadata describes fields and type information and is useful for type checking information. In one implementation, source or target applications rely upon databases and other stores described using an XML compatible language. In an XML based database or document, the metadata is found in an XML schema (also referred to as XSD) describing the database or document structure. XSD is a standard established by the World Wide Web Consortium (W3C) for describing XML based databases and/or documents. For these applications, the metadata describing fields and type is taken directly from the XML compatible language and used immediately for subsequent mapping and type checking operations. Document Type Definition (DTD) is yet another standard used for describing XML documents and in an alternate implementation can be substituted for XSD.

Alternatively, some source and target applications may not be described using XML compatible languages and instead may require one or more conversion operations. If this occurs, either the source, the target or both the source and target applications may first be converted from a non-XML based language into XML or an XML compatible language. Example non-XML compatible languages can include SQL-based databases, variable or fixed delimited text files, unformatted free-form datasets and even raster images with text data. Converting the source and target applications into an XML compatible language provides a neutral language and allows for a more direct comparison of the various fields and types between the source and target applications. Instead of using XML, an alternative approach would convert the source and target applications into another neutral language other than XML and a then perform a similar comparison of fields and types between the source and target applications.

Next, implementations of the present invention display the fields and data types from the metadata in the source applications and target applications (404). Displaying the set of fields and data types exposes data relationship information between the source applications and the target applications. In one implementation, the field and data types are displayed in a graphical user interface as illustrated in FIG. 3. For example, a field may be identified as a "PO Identifier" and the corresponding type can be a "string" that holds the PO Identifier information.

Once the field and type information is understood, a mapping of related fields from the source applications to the target applications occurs according to a set of integration objectives (406). Each field and type in the one or more source applications are associated with a field and type in one or more target applications. Mapping ensures a correspondence exists between a field in at least one source application and another field in at least one target application. The interface can be designed to enable a user or operator to identify a field and type in the source application and draw a connection to a corresponding field and type in the target application. Visually, the example interface in FIG. 3 shows this relationship with a line and arrow connected between the fields.

The set of integration objectives may provide information for integrating applications including a description of fields and guidelines for matching up different data types. For example, integrating a purchase order between a source application and a target application may define both a "PO Identifier" and the "Order Identifier" as a field to hold the unique identifier for the source application and the target application respectively. One of the integration objectives may also provide details on acceptable and unacceptable type matches between different fields. If a source field "PO Identifier" has a type "String" then the integration objectives may indicate a warning when mapping this source field to an "Order Identifier" field in a target application as the "Order Identifier" field has a potentially incompatible field type of integer as illustrated in FIG. 3.

Mapping may also include performing one or more transformations between fields in the source and target applications. These transformations may include "casting" operations that change the type associated with the data in one field into another type before being stored in a second or target field. Alternatively, these transformations may also include executing more complex macros, JavaScript or other programs to massage the data passing between the field of a source application over to the field of a target application.

Once an initial mapping is completed, implementations of the present invention check the type compatibility of the mapped fields between the source applications and the target applications (408). This analysis compares a potential set of values in the fields of the source application again a potential set of acceptable values in the fields of the target application. Further details on this type checking are described later herein.

Depending on the type compatibility results, implementations of the present invention indicates a mapping status according to the type compatibility between the source applications and the target applications (410). An error status indication means one or more fields between the source applications and target applications are incompatible and cannot be mapped. The error status indication is flagged for each field mapping falling into this category of analysis. Because the error status is certain to create run-time errors later when the integration is performed, these failed mappings need immediate attention and correction.

Alternatively, a warning indication is provided if at least one acceptable value is possible between a field mapped between a source and target application. These warning status indications are also flagged for the fields falling into this category of analysis however the integration can continue as it is not certain that a run-time error will occur. To eliminate even the possibility of a run-time error, even the warning status indications should be investigated and resolved before actually performing the integration in a production environment. If the error indication or warning indication are not applied then the mapping between the fields is assured and the integration operations can be commenced.

Figure 5:
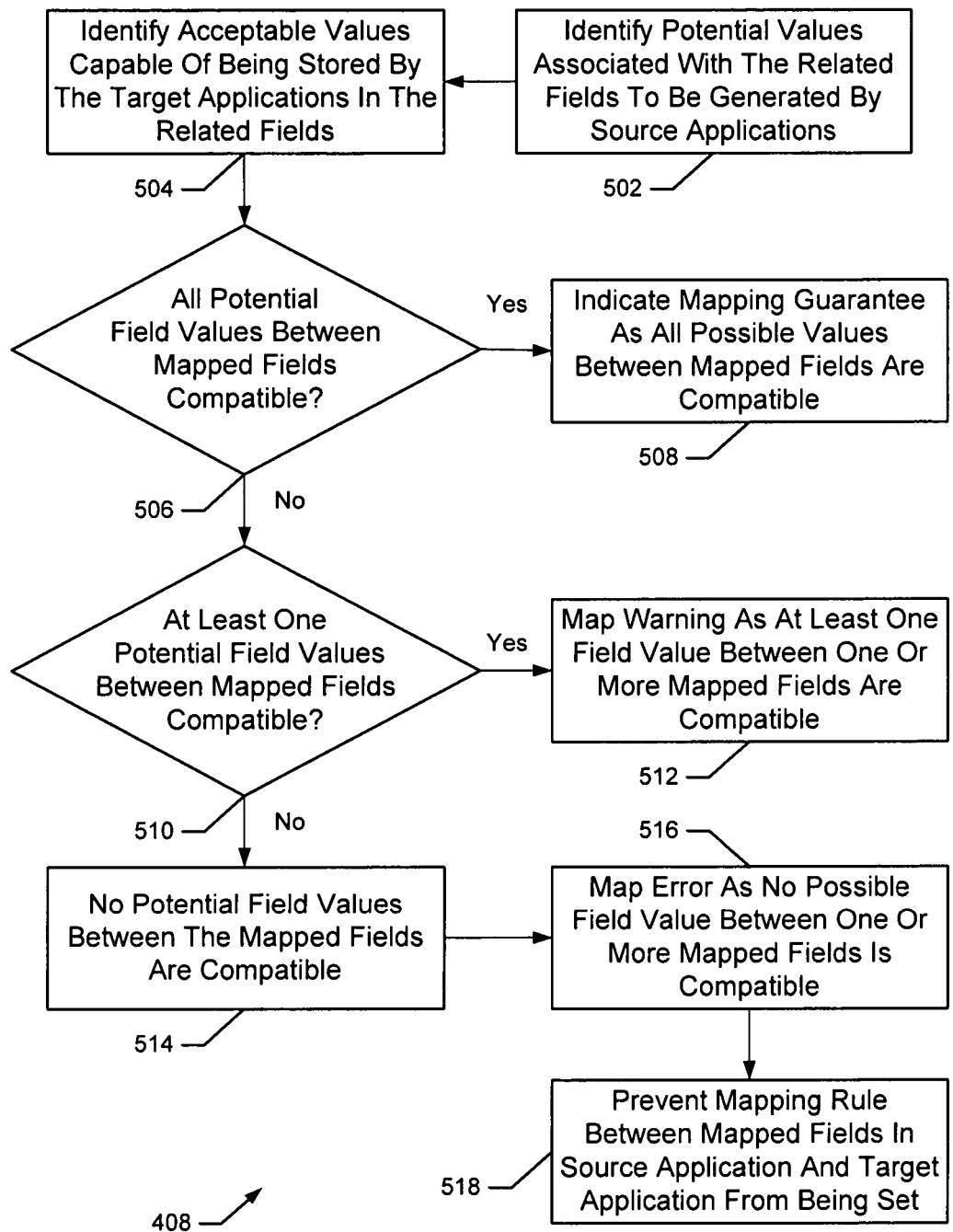
FIG. 5 is a flowchart diagram of the operations used when checking type compatibility in accordance with one implementation of the present invention.

FIG. 5 is a flowchart diagram of the operations used when checking type compatibility. In one implementation, type compatibility begins by identifying potential values associated with the related fields to be generated by source applications (502). Generally, the type of the field in the source application determines a range of values that the source application may generate. For example, a string type may include a sequence of alphanumeric values, an integer value may only include numeric values while a floating point may include a sign, the exponent, and the mantissa (i.e., scientific notation).

Many other types and type definitions are possible and depend on the implementation and details of the source and target applications. In addition, the type compatibility rules including noting the cardinality of field values in the source application to be generated as this also must be compatible with the target application. For example, a purchase order in a source application may allow for as many as 10 different items and thus has a cardinality of 10 but may also contain as little as 1 item and still be a valid purchase order.

Similarly, it is equally important to identify acceptable values capable of being stored by the target applications (504). The analysis examines the type of each related field in the target application and identifies an acceptable range of values to be stored. As previously described, the string type may include both alpha and numeric values while the integer value may only include numeric values. Floating point, array and any other types are analyzed in a similar manner and set of rules for checking the type of each field are generated accordingly. Cardinality of the target application fields are also checked and noted for later comparison. For example, a purchase order in a target application may allow for as many as 5 different items and thus has a cardinality of 5or as little as 1. In many cases, the purchase order on a target application having a cardinality of 5 items would be compatible with a source application having a cardinality of 10 items or greater unless 6 or more items are actually being provided or requested in the purchase order of the source application.

Type compatibility analysis between the mapped fields in the source application and target application determines the type of indicators to provide. Initially, a comparison determines if all the potential field values between the mapped fields of the target and source application are compatible (506). A set of type compatibility rules are generated to determine when values to be generated by the source applications overlaps with the acceptable set of values capable of being stored by the target applications. For example, the type compatibility rules can include comparing the individual fields in the source application against corresponding mapped fields in the target application. It may also include comparing the cardinality between the fields in the source application and target application. For example, assuming the types are compatible, a cardinality of 10 items on a purchase order from a source application is always compatible with a cardinality of IO or greater on the target application since any valid number of items from the source application can be contained by the target application based on cardinality. If this situation occurs, a mapping guarantee is indicated as all possible values between the mapped fields of the source and target application are compatible (508).

However, if not all of the mapped fields are compatible then a determination is made whether at least one potential field value between each of the mapped fields is compatible (510). A similar analysis as previously described is performed except at least one but not all possible field values between one or more mapped fields need be compatible. If this occurs, one implementation of the present invention provides a map warning as at least one field value between one or more mapped fields are compatible. Alternatively, in the event no potential field values between the mapped fields are compatible (514) then a map error is indicated as no possible field value between one or more mapped fields is compatible. In addition to the map error, implementations of the present invention also prevents the mapping rule between mapped fields in source application and target application from being set (518) as it is certain to result in a run-time error when the integration is performed. Accordingly, a user or operator must further investigate and resolve these mapping error indications to continue forward in integrating the source and target applications in the integration project.

Figure 6:
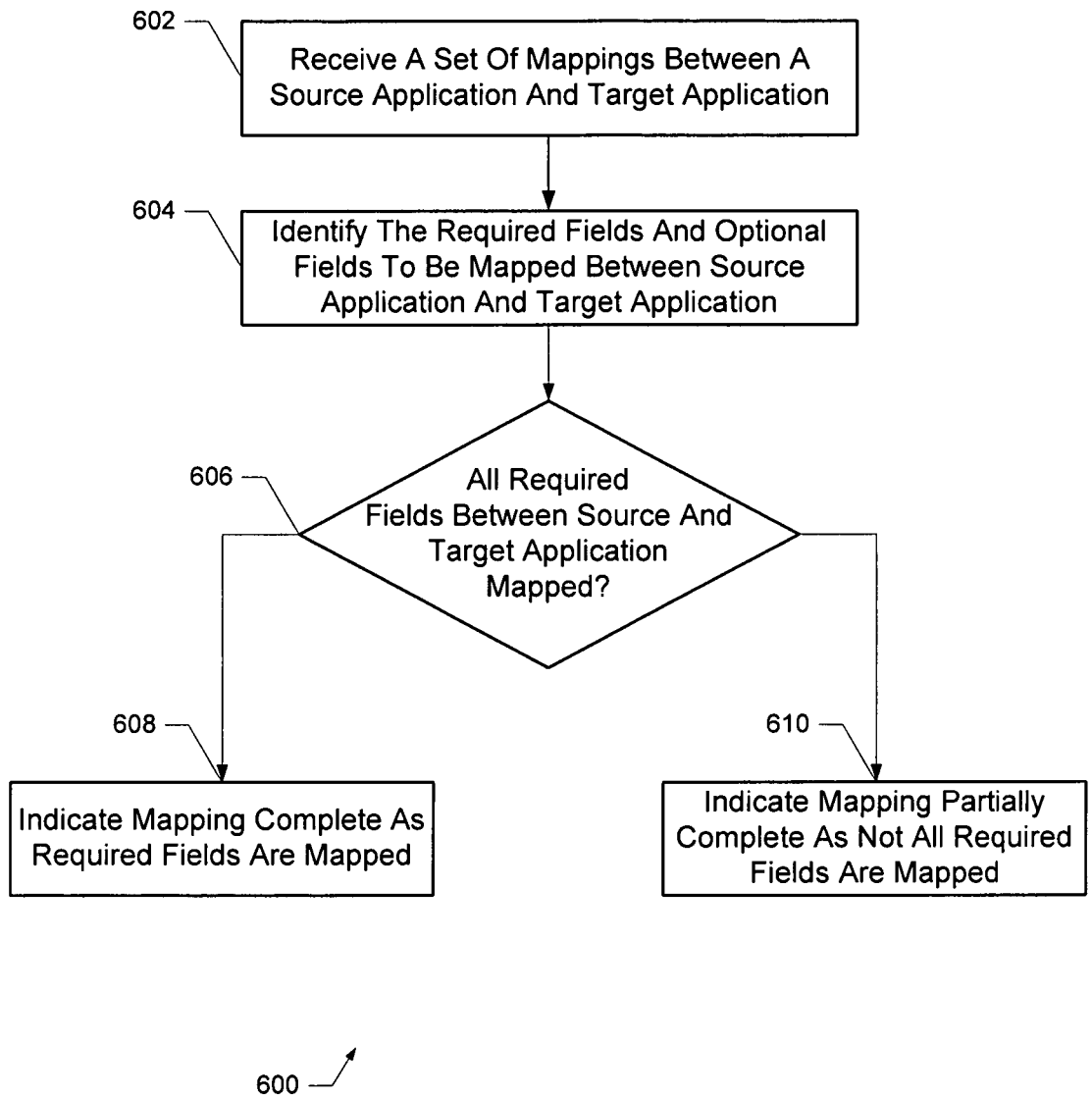
FIG. 6 is a flowchart diagram of the operations used when providing a completion indication in accordance with one implementation of the present invention.

FIG. 6 is a flowchart diagram of the operations used when providing a completion indication in accordance with one implementation of the present invention. Initially, the completion operation receives a set of mappings between a source application and a target application (602). The mappings have already between checked for type compatibility and therefore there are no type incompatibilities or errors in these mappings. However, it is possible that one or more mappings have warnings indicating a possible type incompatibility The completion operation analyzes the fields and other information to identify the required fields and optional fields to be mapped between the source and target application (604). It is important to distinguish between required and optional mappings as the latter optional mappings can be omitted and the mapping still considered complete. For example, the required fields may correspond to all of the fields in the target application as the target application may not be able to function properly without these target application fields mapped from the source application. Similarly, the source application can also specify the required fields even if the required fields are in fact a small subset of all the fields in the source application. Generally, the target application is used to determine the required fields as the target application can be populated from numerious different fields and locations within the source application. Essentially, optional fields are those fields included in the mapping or potential mappings but not required by the target application, the source application or anywhere else.

Once the required fields are identified, the completion operation compares the required fields between the source application and target application with the set of fields already indicated as mapped (606). In the event all required fields are mapped then a completion indicator is set to indicate the mapping has been completed (608), However, if not all the required fields are mapped then partial completion is indicated, typically in a percentage basis (610). For example, if there are 100 required mappings and only 45 of them are completed than the completion indicator will provide a 45% completion indication.

Figure 7:
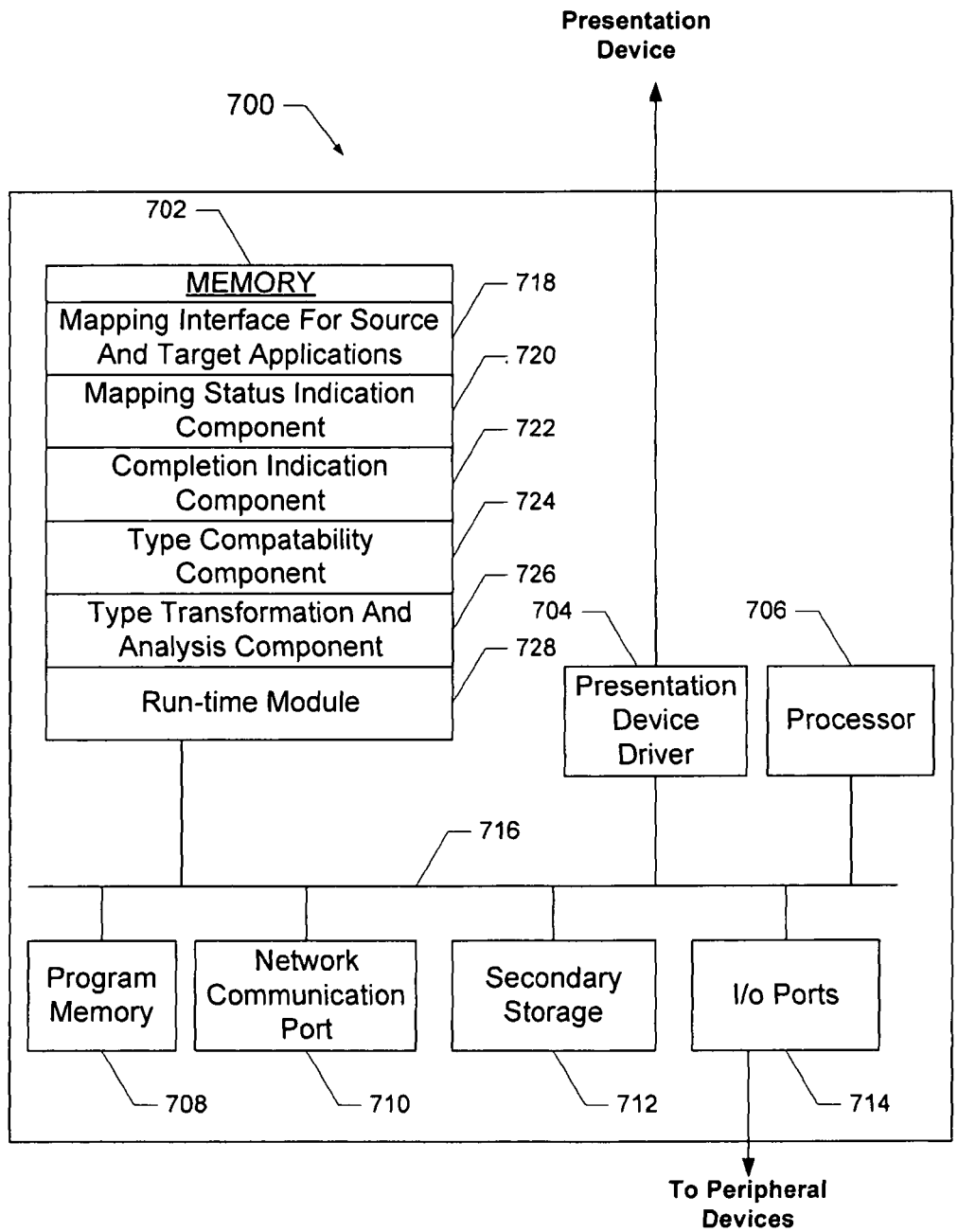
FIG. 7 is a block diagram of a system for performing one implementation of the present invention.

FIG. 7 is a block diagram of a system 700 used in one implementation for performing the apparatus or methods of the present invention. System 700 includes a memory 702 to hold executing programs (typically random access memory (RAM) or writable read-only memory (ROM) such as a flash ROM), a presentation device driver 704 capable of interfacing and driving a display or output device, a program memory 708 for holding drivers or other frequently used programs, a network communication port 710 for data communication, a secondary storage 712 with secondary storage controller, and input/output (I/O) ports 714 also with I/O controller operatively coupled together over a bus 716. In addition to implementing the present invention using a conventional personal computer or server, system 700 can be preprogrammed, in ROM, for example, using field-programmable gate array (FPGA) technology or it can be programmed (and reprogrammed) by loading a program from another source (for example, from a floppy disk, a CD-ROM, or another computer). Also, system 700 can be implemented using customized application specific integrated circuits (ASICs).

In one implementation, memory 702 includes a mapping interface for source and target applications 718, a mapping status indication component 720, a completion indication component 722, a type compatibility component 724, a type transformation and analysis component 726 and a run-time module 728 that manages system resources used when processing one or more of the above components on system 700.

Mapping interface for source and target applications 718 is used to map fields between source and target applications. This interface can be implemented as a graphic user interface to enable a user to visualize and associate the fields of the applications. Alternatively, the mapping interface can also include an application programming interface (API) that allows an initial mapping to be driven by a program having artificial intelligence, fuzzy logic, genetic programming or other routines capable of complex problem solving.

Mapping status indication component 720 provides indicators for individual mappings between fields in a integration project as well as an overall status of the mappings in the integration project. For example mapping status indication component flags specific mappings between fields with warnings or errors depending on the type compatibility analysis. No indication between fields of the source and target applications indicates the individual mapping is assured to be type compatible during runtime. The overall integration project receives a warning or error status if at least one warning or error is contained within the integration project and an mapping assurance if no warnings or errors are present.

Completion indication component 722 provides a relative measure of completion through the mapping interface depending on the status of the individual mappings. For example, the completion indicator is 100% if all the mappings in an integration project are completed and there are no errors or warnings. Even if a few warnings exist, it is also possible that the completion indicator is 100% as long as every source field is mapped to a target field without an error status. Conversely, the completion indicator registers less than 100% completion when one or more errors exist or one or more fields from the field of a source application are not yet mapped to a field in a target application.

Type compatibility component 724 performs type checking between fields in a source application and a target application. In one implementation, a set of type compatibility rules are used to determine when the values to be generated by the one or more source applications overlap with the acceptable set of values capable of being stored by the one or more target applications. For example, this includes comparing the data types of the target and source fields as well as the cardinality of the fields indicated in the complex data types.

Type transformation and analysis component 726 identifies type transformations using casting functions, macros, JavaScript and other scripting routines and assist in determining type compatibility. In some cases, the type transformations can be performed to correct otherwise incompatible types between a pair of fields from a source and target application.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of assuring transformations between applications, comprising:
   mapping one or more related fields from a set of fields between the one or more source applications and the one or more target applications according to a set of integration objectives;
   checking a data type compatibility for each of the one or more related fields mapped between the one or more source applications and the one or more target applications;
   checking a field value compatibility between at least a first field of one of the source applications and a mapped field in one or more of the target applications by comparing a potential set of values for the first field against an acceptable set of values supported by the related fields in the one or more target applications, wherein checking the field value compatibility for each of the one or more related fields further includes:
      determining whether the potential set of values overlaps with the acceptable set of values supported by the one or more related fields in the one or more target applications;
   checking a cardinality compatibility between at least a second field of one of the source applications and one or more of the target applications by comparing a cardinality of values allowed by the second field of the source application with a cardinality of values allowed by the mapped field of the one or more target applications;
   specifying a predetermined set of mappings required between the one or more source applications and the one or more target applications necessary in order to assure the transformations between the one or more target applications and one or more source applications;
   comparing the predetermined set of required mappings against one or more mapped related fields from the set of fields in the one or more source applications and the one or more target applications; and
   indicating a visual percentage mapping complete status corresponding to the data type compatibility, the field value compatibility, the cardinality compatibility, and the comparison of the predetermined set of required mappings against the one or more mapped related fields and a type compatibility identified between the set of fields in the one or more source applications and the one or more target applications.

2. The method of claim 1 further comprising:
displaying a set of fields derived from metadata associated with the source applications and target applications.

3. The method of claim 1 wherein the displaying further comprises discovering metadata for one or more source applications and one or more target applications in an integration project.

4. The method of claim 1 wherein the metadata is derived from a schema compatible with XML.

5. The method of claim 3 wherein the metadata for an XML compatible documents is derived from an XML schema (XSD).

6. The method of claim 3 wherein displaying the set of fields exposes data relationship information between the source applications and the target applications.

7. The method of claim 3 wherein the displaying further includes a set of data types corresponding to the set of fields.

8. The method of claim 1 wherein the mapping creates a correspondence between a field in at least one source application to another field in at least one target application.

9. The method claim 1 wherein the mapping further includes one or more data transformations to be performed as data associated with the one or more related fields is exchanged between the one or more target applications and the one or more source applications.

10. The method of claim 1 wherein a set of type compatibility rules are used to determine when the potential set of values generated by the one or more source applications overlaps with the acceptable set of values supported by the one or more related fields in the one or more target applications.

11. The method of claim 1 further comprising ensuring a guaranteed mapping when each value in the potential set of values generated by the one or more source applications are in the acceptable set of values supported by the one or more related fields in the one or more target applications.

12. The method of claim 1 further comprising providing a map warning when at least one but not all possible field values between the one or more mapped fields are compatible.

13. The method of claim 1 further comprising providing a map error no possible field values between the mapped fields are compatible.

14. A system for assuring transformations between applications, comprising:
a processor designed to execute instructions;
a memory containing instructions executable on the processor that are configured to:
map one or more related fields from a set of fields between the one or more source applications and the one or more target applications according to a set of integration objectives,
check a data type compatibility for each of the one or more related fields mapped between the one or more source applications and the one or more target applications,
check a field value compatibility between at least a first field of one of the source applications and a mapped field in one or more of the target applications by comparing a potential set of values for the first field against an acceptable set of values supported by the related fields in the one or more target applications, wherein instructions that check the field value compatibility for each of the one or more related fields further includes instructions that:
determine whether the potential set of values overlaps with the acceptable set of values capable of being stored by the one or more target applications in the one or more related fields,
check a cardinality compatibility between at least a second field of one of the source applications and one or more of the target applications by comparing a cardinality of values allowed by the second field of the source application with a cardinality of values allowed by the mapped field of the one or more target applications,
specify a predetermined set of required mappings between the one or more source applications and the one or more target applications necessary in order to assure the transformations between the one or more target applications and one or more source applications,
compare the predetermined set of required mappings against one or more mapped related fields from the set of fields in the one or more source applications and the one or more target applications, and
indicate a visual percentage mapping complete status corresponding to the data type compatibility, the field value compatibility, the cardinality compatibility, and the comparison of the predetermined set of required mappings against the one or more mapped related fields and a type compatibility identified between the set of fields in the one or more source applications and the one or more target applications.

15. The system of claim 14 further comprising instructions that display a set of fields derived from metadata associated with the source applications and target applications.

16. The system of claim 14 wherein the instructions that display further comprise instructions that discover metadata for one or more source applications and one or more target applications in an integration project.

17. The system of claim 16 wherein the metadata is derived from a schema compatible with XML.

18. The system of claim 16 wherein the metadata is derived from a schema compatible with a XSD format.

19. The system of claim 16 wherein the instructions that display the set of fields exposes data relationship information between the source applications and the target applications.

20. The system of claim 16 wherein the instructions that display further include a set of data types corresponding to the set of fields when displayed.

21. The system of claim 14 wherein the instructions that map create a correspondence between a field in at least one source application to another field in at least one target application.

22. The system of claim 14 wherein the instructions that map are further designed to perform one or more data transformations as data associated with the one or more related fields is exchanged between the one or more target applications and the one or more source applications.

23. The system of claim 14 wherein a set of type compatibility rules are used to determine when the potential set of values generated by the one or more source applications overlaps with the acceptable set of values capable of being stored by the one or more target applications in the one or more related fields.

24. The system of claim 14 further comprising instructions that ensure a guaranteed mapping when each value in the potential set of values generated by the one or more source applications are in the acceptable set of values that capable of being stored by the one or more target applications in the one or more related fields.

25. The system of claim 14 further comprising instructions that provide a map warning when at least one but not all possible field values between the one or more mapped fields are compatible.

26. The system of claim 14 further comprising instructions that provide a map error when no possible field values between the mapped fields are compatible.

27. A computer program product for assuring transformations between applications stored on a machine readable storage device, comprising instructions operable to cause a programmable processor to:
  map one or more related fields from a set of fields between the one or more source applications and the one or more target applications according to a set of integration objectives;
  check a data type compatibility for each of the one or more related fields mapped between the one or more source applications and the one or more target applications;
  check a field value compatibility between at least a first field of one of the source applications and a mapped field in one or more of the target applications by comparing a potential set of values for the first field against an acceptable set of values supported by the related fields in the one or more target applications, wherein instructions that check the field value compatibility for each of the one or more related fields further comprises instructions operable to cause a programmable processor to:
    determine whether the potential set of values overlaps with the acceptable set of values supported by the one or more related fields in the one or more target applications;
  check a cardinality compatibility between at least a second field of one of the source applications and one or more of the target applications by comparing a cardinality of values allowed by the second field of the source application with a cardinality of values allowed by the mapped field of the one or more target applications;
  specify a predetermined set of required mappings between the one or more source applications and the one or more target applications necessary in order to assure the transformations between the one or more target applications and one or more source applications;
  compare the predetermined set of required mappings against one or more mapped related fields from the set of fields in the one or more source applications and the one or more target applications; and
  indicate a visual percentage mapping complete status corresponding to the data type compatibility, the field value compatibility, the cardinality compatibility, and the comparison of the predetermined set of required mappings against the one or more mapped related fields and a type compatibility identified between the set of fields in the one or more source applications and the one or more target applications.

28. The computer program product of claim 27 further comprising instructions operable to cause a programmable processor to:
  display a set of fields derived from metadata associated with the source applications and target applications.

29. The computer program product of claim 27 wherein the display instructions further comprises instructions operable to cause a programmable processor to discover metadata for one or more source applications and one or more target applications in an integration project.

30. The computer program product of claim 29 wherein the metadata is derived from a schema compatible with XML.

31. The computer program product of claim 29 wherein the metadata for an XML document is derived from an XML schema (XSD).

32. The computer program product of claim 27 further comprising instructions operable to cause a programmable processor to ensure a guaranteed mapping when each value in the potential set of values generated by the one or more source applications are in the acceptable set of values supported by the one or more related fields in the one or more target applications.

33. The computer program product of claim 27 further comprising instructions operable to cause a programmable processor to provide a map warning when at least one but not all possible field values between the one or more mapped fields are compatible.

34. The computer program product of claim 27 further comprising instructions operable to cause a programmable processor to provide a map error when no possible field values between the mapped fields are compatible.

* * * * *